US007318452B2

(12) United States Patent
Yoshihara et al.

(10) Patent No.: US 7,318,452 B2
(45) Date of Patent: Jan. 15, 2008

(54) ACCUMULATOR

(75) Inventors: Hisao Yoshihara, Shizuoka (JP); Kenji Sasaki, Shizuoka (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 10/580,522

(22) PCT Filed: Nov. 24, 2004

(86) PCT No.: PCT/JP2004/017372

§ 371 (c)(1),
(2), (4) Date: May 24, 2006

(87) PCT Pub. No.: WO2005/052381

PCT Pub. Date: Jun. 9, 2005

(65) Prior Publication Data

US 2007/0102052 A1 May 10, 2007

(30) Foreign Application Priority Data

Nov. 26, 2003 (JP) ............................. 2003-395467

(51) Int. Cl.
*F16L 55/04* (2006.01)

(52) U.S. Cl. .......................................... 138/30; 138/26

(58) Field of Classification Search .................. 138/26, 138/30

See application file for complete search history.

(56) References Cited

U.S. PATENT DOCUMENTS

| | | | | |
|---|---|---|---|---|
| 2,460,121 | A * | 1/1949 | Brielmaier | 138/30 |
| 3,195,576 | A * | 7/1965 | Mercier | 138/30 |
| 4,213,545 | A * | 7/1980 | Thompson et al. | 222/386.5 |
| 5,133,387 | A * | 7/1992 | Pietrykowski et al. | 138/30 |
| 6,502,828 | B1 | 1/2003 | Sasaki | |
| 6,848,755 | B2 * | 2/2005 | Yuda et al. | 303/87 |
| 2004/0250866 | A1 * | 12/2004 | Bartsch et al. | 138/30 |

FOREIGN PATENT DOCUMENTS

| | | | |
|---|---|---|---|
| DE | 19949588 | A1 | 5/2000 |
| DE | 10207248 | A1 | 4/2003 |
| JP | 2000-170703 | A1 | 6/2000 |
| JP | 2000-186767 | A1 | 7/2000 |
| JP | 2002-122101 | | 4/2002 |
| JP | 2003-074503 | A1 | 3/2003 |

* cited by examiner

*Primary Examiner*—James Hook
(74) *Attorney, Agent, or Firm*—Harness, Dickey & Pierce, P.L.C.

(57) ABSTRACT

An accumulator in which a pressure sealed chamber and a pressure flow-in chamber are formed by an operation member including a metallic bellows provided within a housing constituted by a gas end cover and a bottomed tubular shell, wherein a cross sectional inner outline of a peripheral edge portion of the gas end cover is an oval shape which is concave to the pressure sealed chamber side, and a dead space is not formed, so that a capacity of a volume adjusting spacer is reduced by eliminating a dead space, a working step is reduced by simplifying a shape of the gas end cover, and a margin of welding penetration depth is increased by thickening of a backing metal portion.

1 Claim, 3 Drawing Sheets

PRIOR ART

ACCUMULATOR

This is a nationalization of PCT Application of International Publication No. WO 2005/052381 published on Jun. 9, 2005.

TECHNICAL FIELD

The present invention relates to an accumulator used as a pressure accumulating apparatus, a pulsation damping apparatus or the like. The accumulator in accordance with the present invention is used in a hydraulic apparatus of a vehicular brake system and various industrial fluid pressure systems.

BACKGROUND ART

For example, in the hydraulic apparatus of the vehicular brake system, for the purpose of pressure accumulation or pulsation damping, there is employed an accumulator in which a pressure sealed chamber and a pressure flow-in chamber are formed by an operation member including a flexible metallic bellows. The accumulator is structured such as to damp and absorb a vibration by balancing a pressure in the pressure sealed chamber determined by the expansion and contraction of the metallic bellows and a pressure in the pressure flow-in chamber determined by the flow-in of the pressure fluid from the system side, and holds a high-pressure gas sealed within the pressure sealed chamber and the fluid sealed within the pressure flow-in chamber, and a gas end cover is installed in such a manner as to close an open end portion of a bottomed shell for fixing the metallic bellows.

In recent years, a weight saving of the vehicular parts is required for the purse of improving a specific fuel consumption or the like, and a weight saving of an accumulator 101 corresponding to the vehicular part is tried by reducing a thickness of a gas end cover 104 corresponding to a part of a constituting part of a housing 102. However, as shown in FIG. 3, since a thickness of a peripheral edge portion 105 of the gas end cover 104 is thin, there occurs necessity of largely curving an end portion of the peripheral edge portion 105 to an inner diameter side from a step concave portion 111 coupled to the shell 103 so as to secure a fixing portion 108 for fixing the metallic bellows 107. Accordingly, a dead space 109 is formed in the inner diameter side of the curved portion and a volume adjusting space 110 becomes large, so that there is a problem that a weight becomes heavy as well as an entire of the accumulator 101 becomes large in an axial direction.

Further, since the shape in which the end portion of the peripheral edge portion 105 is largely curved to the inner diameter side is employed for securing the fixing portion 108 as mentioned above, there is a problem that working steps for making the gas end cover 104 in the curved shape is increased.

Further, since the step concave portion 111 is formed in the curved portion as shown in FIG. 4, and the gas end cover 104 and the shell 103 are coupled at a weld portion 106 by aligning the step concave portion 111 and a terminal of the shell 103 and applying a carbon dioxide gas laser welding, a backing metal structure in which a spatter or the like is not scattered to an internal portion is employed. However, if the peripheral edge portion is formed in the curved shape, there occurs a problem that a thickness W1 of the backing metal portion becomes thin and there is a limit for securing a depth of weld penetration.

In this case, Japanese Unexamined Patent Publication No. 2002-122101 (Patent Document 1) proposes a structure in which a shape of a cross sectional center portion is formed in a convex shape to the pressure sealed chamber side and in a concave shape in the peripheral edge portion in order to secure strength in a state in which the thickness of the gas end cover is thin, however, since the peripheral edge portion is formed in the concave shape to the pressure sealed chamber side, the dead space exists, so that the structure cannot be effective for making the volume adjusting spacer small and making the working steps of the gas end cover easy.

Patent Document 1:

Japanese Unexamined Patent Publication No. 2002-122101

DISCLOSURE OF THE INVENTION

Problem to be Solved by the Invention

The present invention is made by taking the points mentioned above into consideration, and an object of the present invention is to provide an accumulator in which a pressure sealed chamber and a pressure flow-in chamber are formed by an operation member including a metallic bellows provided within a housing constituted by a gas end cover and a bottomed tubular shell, wherein a capacity of a volume adjusting spacer is reduced by eliminating a dead space, working steps is reduced by simplifying a shape of the gas end cover, and a margin of a welding penetration depth is improved by increasing a thickness of a backing metal portion.

Means for Solving the Problem

In order to achieve the object mentioned above, in accordance with a first aspect of the present invention, there is provided an accumulator in which a pressure sealed chamber and a pressure flow-in chamber are formed by an operation member including a metallic bellows provided within a housing constituted by a gas end cover and a bottomed tubular shell, wherein a cross sectional inner outline of a peripheral edge portion of the gas end cover is an oval shape which is concave to the pressure sealed chamber side, and a dead space is not formed.

Further, in accordance with a second aspect of the present invention, there is provided an accumulator as recited in the first aspect, wherein a pressure charging port communicating with the pressure sealed chamber is provided in an inner peripheral side of a center portion of the gas end cover, and a hexagon nut shape portion integrally formed with the gas end cover is provided in an outer peripheral side.

Effect of the Invention

In the accumulator in accordance with the first aspect of the present invention having the structure mentioned above, since the cross sectional inner outline of the peripheral edge portion of the gas end cover is the oval shape which is concave to the pressure sealed chamber side, and the dead space is not formed, it is possible to make a capacity of the volume adjusting spacer small, and it is possible to make entire weight light as well as it is possible to make the entire of the accumulator small in an axial direction.

Further, since the cross sectional inner outline of the peripheral edge portion is the oval shape which is concave to the pressure sealed chamber side, the thickness of the end portion is thick, and since it is not necessary to employ the shape in which the end portion of the peripheral edge portion is curved to the inner diameter side for forming the fixing portion to fix the metallic bellows, it is easy to work the gas end cover, and the working steps can be reduced.

Further, since the cross sectional inner outline of the peripheral edge portion is the oval shape which is concave to the pressure sealed chamber side, the thickness of the end portion is thick, it is possible to make the backing metal portion thick even if the step concave portion bonding to the end surface of the shell is formed, and it is possible to sufficiently secure the welding penetration depth at a time of welding to the shell.

Further, in the invention in accordance with the second aspect, since the hexagon nut shape corresponding to the position to which a tool such as a spanner or the like is applied for screwing the accumulator to a piping is integrally formed with the gas end cover, it is possible to reduce the number of parts, it is possible to omit a step of fixing a hexagon nut, and it is possible to simplify an assembling step of the housing.

DESCRIPTION OF REFERENCE NUMERALS

Figure 1:
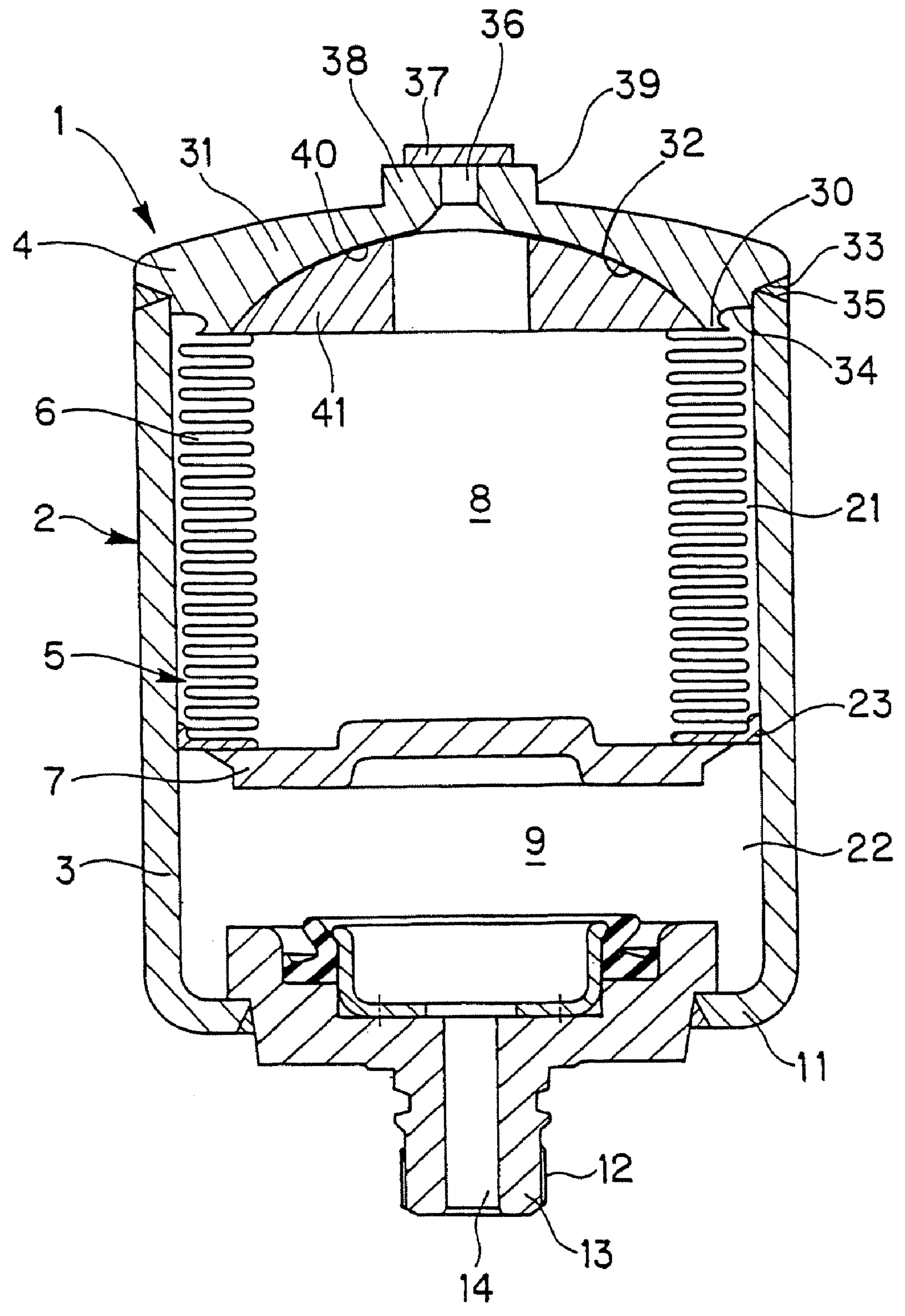
FIG. 1 is a cross sectional view of an accumulator in accordance with an embodiment of the present invention.

1 accumulator
2 housing
3 shell
4 gas end cover
5 operation member
6 metallic bellows
7 bellows cap
8 pressure sealed chamber
9 pressure flow-in chamber
31 peripheral edge portion
32 inner outline
36 pressure charging port
38 center portion
39 hexagon nut shape portion
40 space
41 volume adjusting spacer

BEST MODE FOR CARRYING OUT THE INVENTION

Next, a description will be given of an embodiment in accordance with the present invention with reference to the accompanying drawings. In this case, the scope of the invention is not limited to the contents described in the mode for carrying out the invention unless any specific limited description is given.

An accumulator 1 in accordance with the embodiment corresponds to a metallic bellows type accumulator, and is structured as follows.

First, as shown in FIG. 1, a housing 2 is provided in such a manner that a gas end cover 4 is fixed to an open end portion of a bottomed tubular shell 3, and an operation member 5 provided with a metallic bellows 6 and a bellows cap 7 is accommodated in an inner portion of the housing 2. The metallic bellows 6 is structured such that one end portion is fixed to the gas end cover 4, and the other end portion is fixed to the bellows cap 7. Accordingly, an inner portion of the housing is sectioned into a pressure sealed chamber 8 in an inner side of the metallic bellows 6 and the bellows cap 7 and a pressure flow-in chamber 9 in an outer side thereof.

A member provided with a tubular mounting portion 13 is fixed to an end wall portion 11 of the shell 3 constituting a part of the housing 2. The tubular mounting portion 13 is provided with a thread portion 12 for connecting the accumulator 1 to a pressure piping in a hydraulic system side (not shown) or the like in an outer periphery. Further, a fluid flow-in port 14 for introducing a pressure fluid in the system side to the pressure flow-in chamber 9 is provided in an inner peripheral side of the mounting portion 13.

Further, an annular sliding member 23 is installed to an outer peripheral side of the other end portion of the metallic bellows 6 fixed to the bellows cap 7 or an outer peripheral side of the bellows cap 7, and an outer peripheral side of the sliding member 23 slides to an inner peripheral side of the shell 3 at a time when the metallic bellows 6 is expanded and contracted, and at a time when the bellows cap 7 moves. Since the bellows cap 7 moves in parallel to the inner peripheral surface of the shell 3 and the metallic bellows 6 expands and contracts in parallel to the inner peripheral surface of the shell 3 on the basis of the sliding motion of the sliding member 23, it is possible to prevent the bellows cap 7 and the metallic bellows 6 from eating into the inner peripheral surface of the shell 3. In this case, the sliding member 23 is provided with a coupling portion (not shown) for preventing the pressure flow-in chamber 9 from being separated into a space 21 in the metallic bellows side (an upper side in the drawing) and a space 22 in the fluid flow-in port side by the sliding member 23.

The gas end cover 4 constituting a part of the housing 2 is structured such that a cross sectional inner outline 32 of a peripheral edge portion 31 is formed in an oval shape, and a volume adjusting spacer 41 is installed to a space 40 formed with a line connecting both sides of one end portion of the metallic bellows 6. A thickness of the peripheral edge portion 31 becomes thicker gradually from an inner peripheral side toward an outer peripheral side, and a step concave portion 33 is formed in an outer peripheral side of a peripheral edge portion end surface 34 and is fixed to an end surface 35 in an open end portion side of the shell 3 in accordance with a carbon dioxide gas laser welding. Further, an inner peripheral side of the peripheral edge portion end surface 34 is provided with a fixing portion 30 for fixing one end portion of the metallic bellows 6. A center portion 38 is provided with a pressure charging port 36 for charging a gas to the pressure sealed chamber 8 in an inner peripheral side. After the gas is charged to the pressure sealed chamber 8 through the pressure charging port 36 so as to obtain a predetermined pressure, the pressure charging port 36 is fixed by a plug member 37 to be closed. An outer peripheral side of the center portion 38 is provided with a hexagon nut shaped portion 39 corresponding to a shape suitable for applying a tool at a time of fixing the thread portion 12 provided in the outer periphery of the mounting portion 13 of the accumulator 1 to the piping by rotating. Accordingly, the hexagon nut shaped portion 39 is integrally formed with the gas end cover 4.

Figure 2:
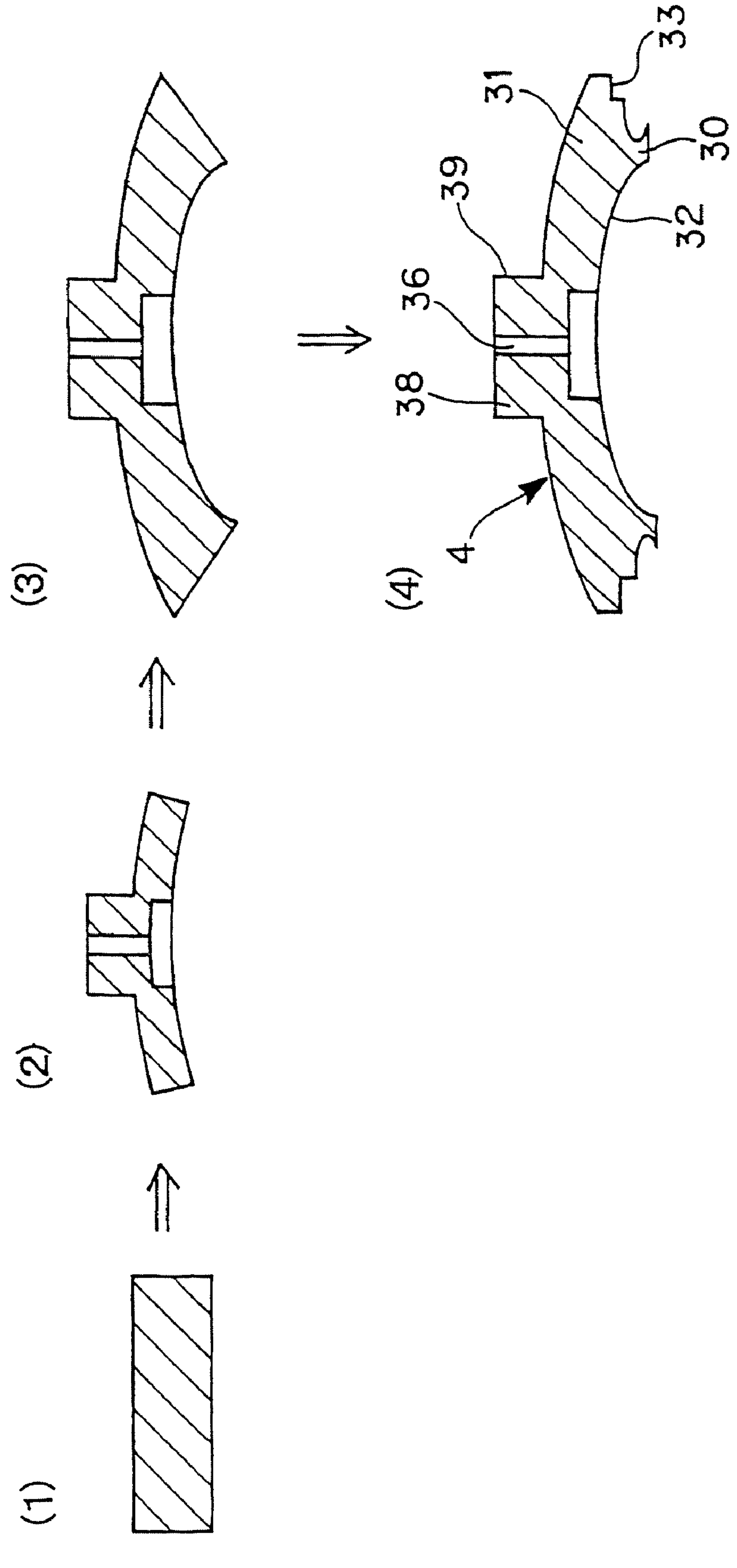
FIG. 2 is a cross sectional view in each of manufacturing stages of a gas end cover in FIG. 1.
Figure 3:
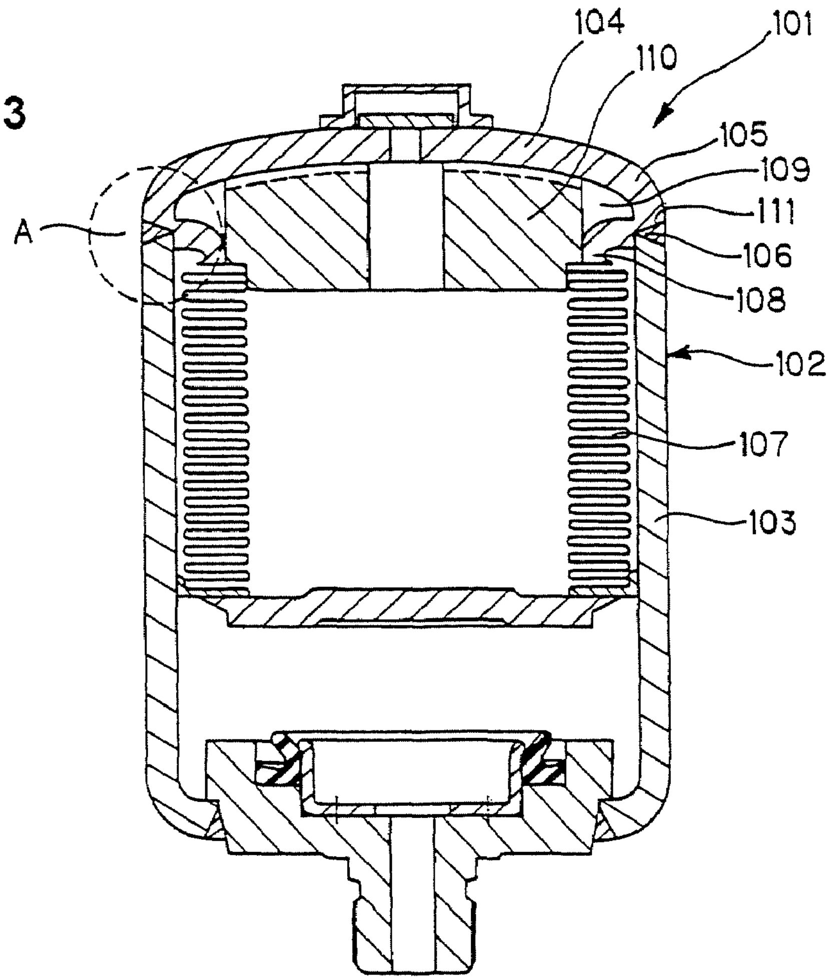
FIG. 3 is a cross sectional view of an accumulator in accordance with a conventional art.
Figure 4:
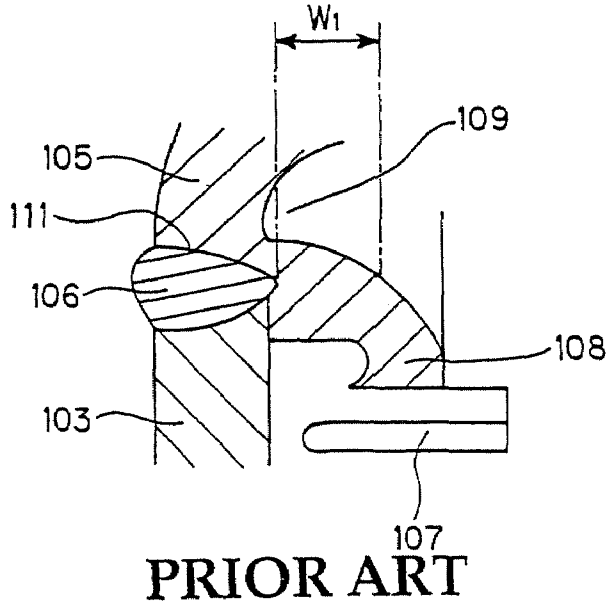
PRIOR ART FIG. 4
FIG. 4 is an enlarged cross sectional view of a portion A in FIG. 3.

A manufacturing method of the gas end cover has a method shown in FIG. 2. First, as shown in FIG. 2(1), a plate-shaped member in a suitable size for the gas end cover is formed in accordance with a press molding. Next, press molding for forming a hexagon nut shape is applied to a center portion of the plate-shapedmember by a step called "buckling" shown in FIG. 2(2). At this time, the pressure charging port communicating with the pressure sealed chamber is simultaneously provided. Further, press molding is applied to the member where the hexagon nut shape is formed, so that an inner outline of a peripheral edge portion is formed into an oval shape and a thickness becomes thicker gradually from the inner peripheral side toward the outer peripheral side, by a step called "warping" shown in FIG. 2(3). Finally, a "cutting step" shown in FIG. 2(4) applies a cutting work for forming the step concave portion for coupling to the shell and the fixing portion for fixing the metallic bellows, in the outerperipheral side end portion. Accordingly, it is possible to omit the press step for executing a deep drawing which is conventionally executed.

In this case, as the metallic bellows 6, it is possible to employ an electro-deposited bellows, a formed bellows, a welded bellows and the like. However, it is possible to employ another material bellows in accordance with a specification and an intended use of the accumulator 1. Further, as the gas used in the pressure sealed chamber 8, a nitrogen gas is preferable, however, another gas may be employed.

Since the accumulator 1 having the structure mentioned above is formed in the oval shape in which the cross sectional inner outline 32 of the peripheral edge portion 31 of the gas end cover 4 constituting a part of the housing 2 is concave to the pressure sealed chamber 8 side, the dead space is not formed and it is possible to make the volume adjusting spacer 41 small. Further, since the end portion of the peripheral edge portion 31 is sufficiently thick, it is further possible to form the fixing portion 30 for fixing the metallic bellows 6 even when the step concave portion 33 for coupling to the shell 3 is formed in the end surface 34. Accordingly, it is not necessary to curve the end portion of the gas end cover 4 to the inner peripheral side for forming the fixing portion 30, and it is possible to easily work the gas end cover 4. Further, even when the step concave portion 33 for coupling to the shell 3 is formed in the peripheral edge portion end surface 34, it is possible to make the thickness of the backing metal portion thick, because the thickness of the end portion of the peripheral edge portion is sufficiently thick. Accordingly, it is possible to secure the welding penetration depth at a time of welding the shell 3 and the gas end cover 4.

Further, since the hexagon nut shape portion 39 is integrally provided in the center portion 38 of the gas end cover 4, it is not necessary to fix the hexagon nut after fixing the plug member 37 to the charging port 36 formed in the center portion 38, the number of the parts is reduced, and it is possible to simplify the working steps.

What is claimed is:

1. An accumulator (1), comprising:

a housing (2) including a bottomed tubular shell (3) having an end surface (35) in an open end portion;

an end cover (4) with a step concave portion (35) radially overlapping and welded to said end surface (35) of said tubular shell (3) and including a fixing portion (30) received in said open end portion of said tubular shell (3), wherein a cross sectional inner outline (32) of a peripheral edge portion (31) of said end cover (4) is an oval shape which is concave;

an operation member (5) including a metallic bellows (6) fixed to said fixing portion (30) formed in said end cover (4), wherein a pressure sealed chamber (8) and a pressure flow-in chamber (9) are formed by said operation member (5); and a spacer (41) installed in a space (40) formed by a line connecting both sides of one end portion of the metallic bellows (6) fixed to said fixing portion (30), such that no space is formed between the gas end cover (4) and the spacer (41).

* * * * *